Aug. 14, 1962
R. A. CLARK
3,049,166
STRIP STAMP APPLYING AND SQUEEZING MECHANISM
Filed March 18, 1960
8 Sheets-Sheet 1
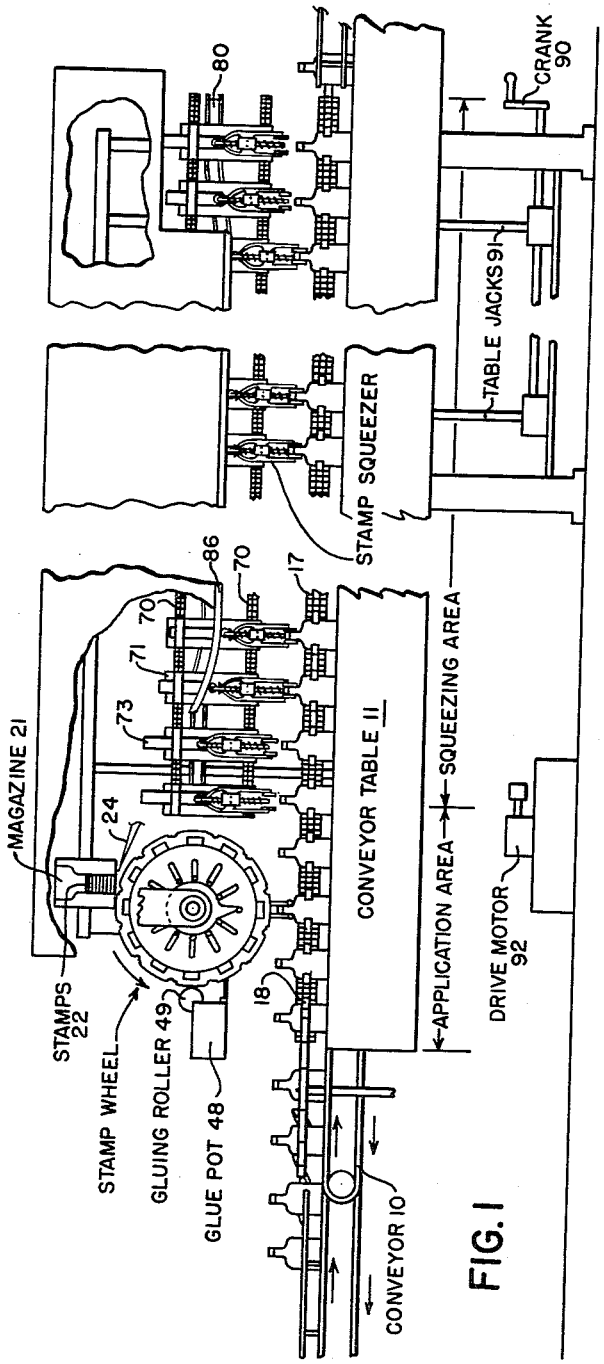
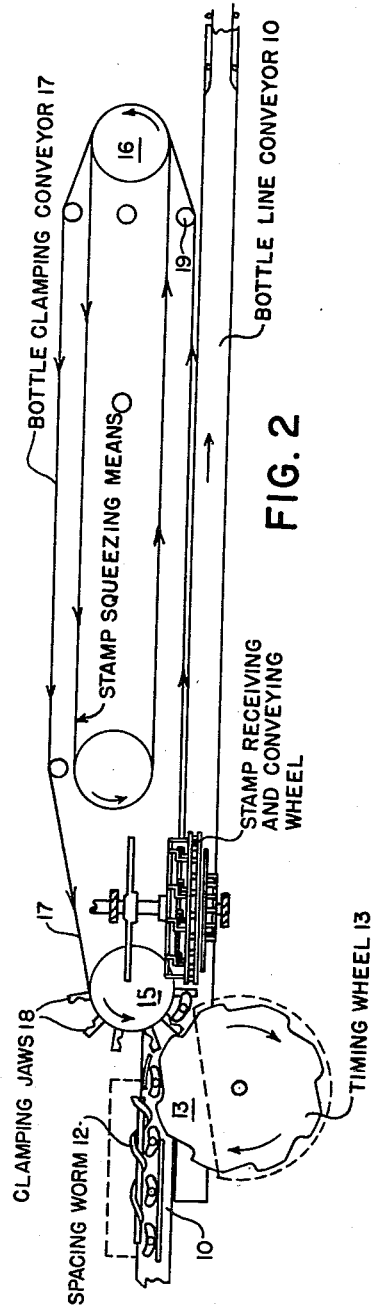
INVENTOR.
ROBERT A. CLARK
BY *Arthur H. Robert*
ATTORNEY

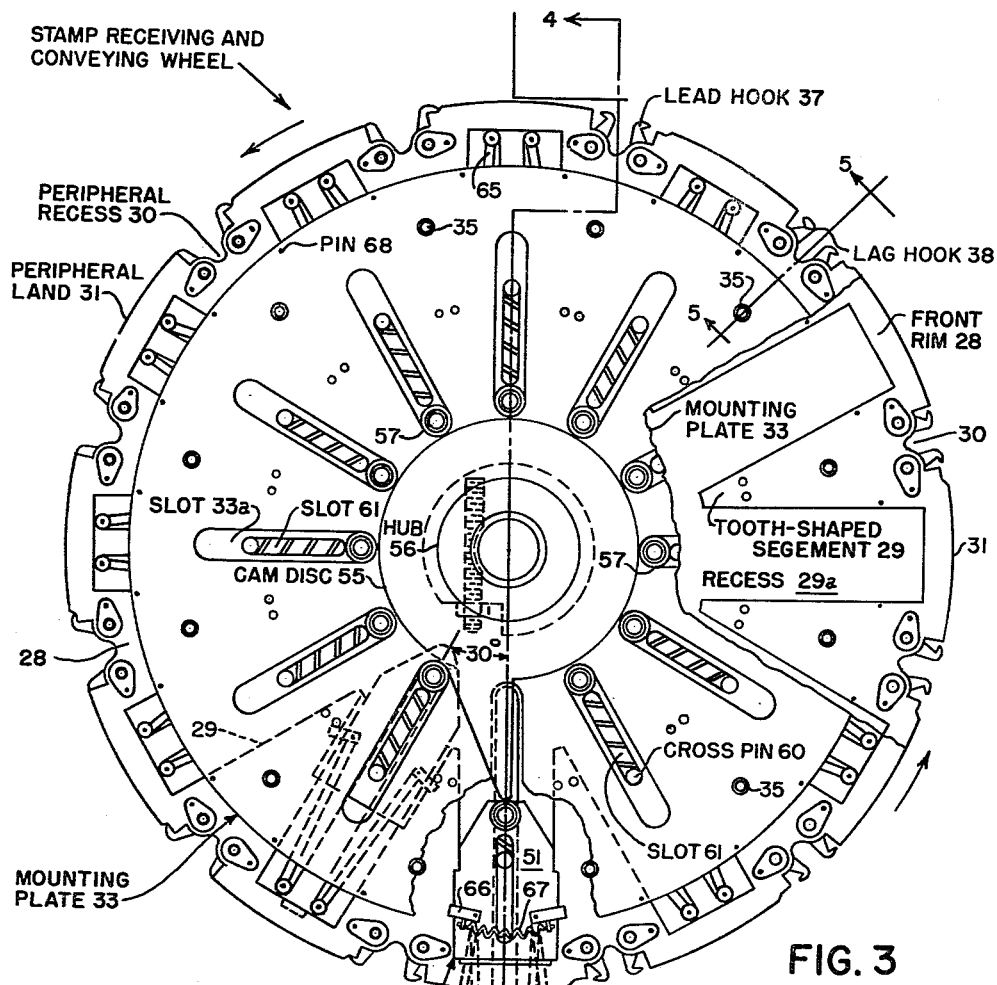

Aug. 14, 1962   R. A. CLARK   3,049,166
STRIP STAMP APPLYING AND SQUEEZING MECHANISM
Filed March 18, 1960   8 Sheets-Sheet 3

INVENTOR.
ROBERT A. CLARK
BY *Arthur Robert*
ATTORNEY

Aug. 14, 1962 R. A. CLARK 3,049,166
STRIP STAMP APPLYING AND SQUEEZING MECHANISM
Filed March 18, 1960 8 Sheets-Sheet 4
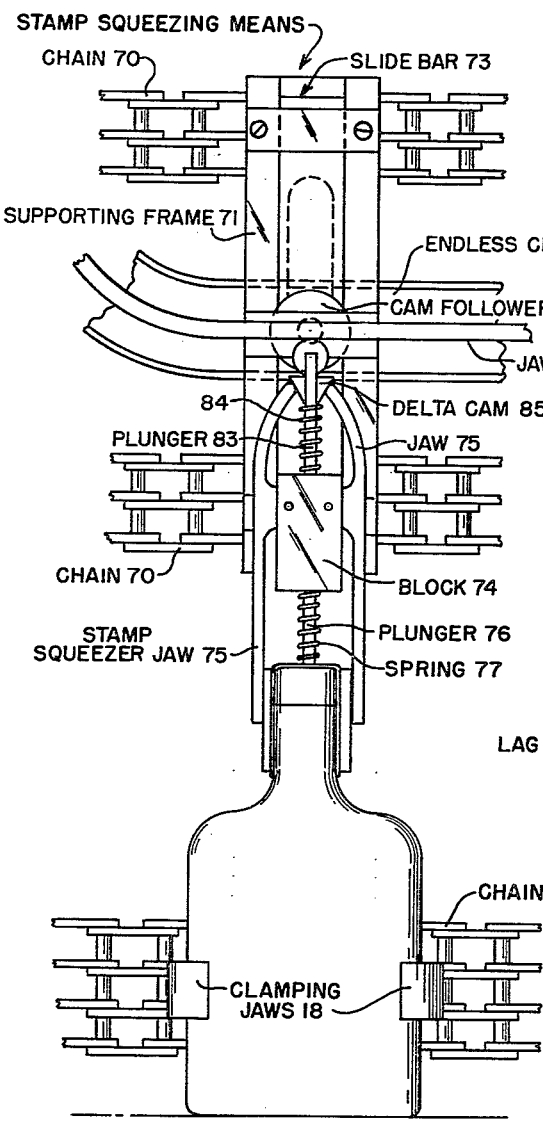
FIG. 10
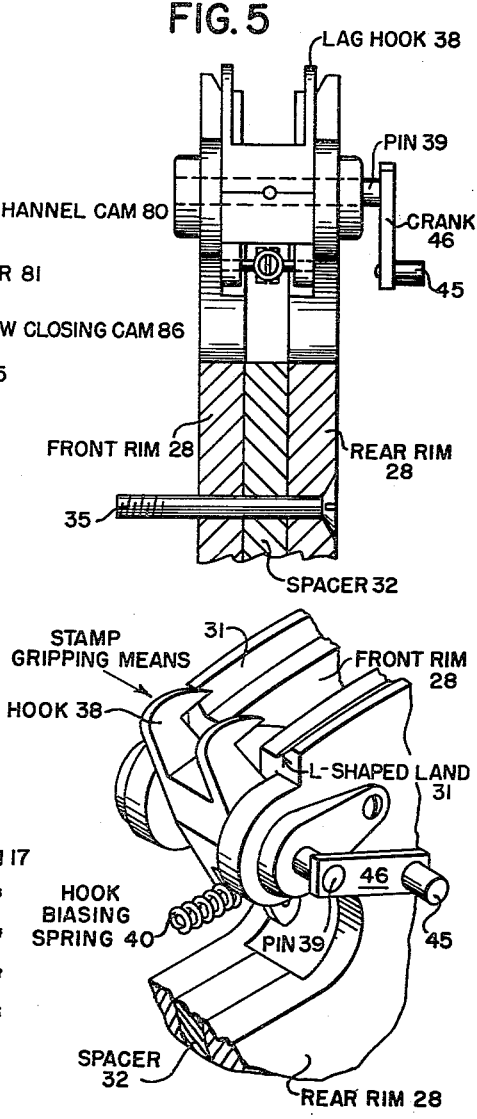
FIG. 5
FIG. 6
INVENTOR
ROBERT A. CLARK
BY Arthur Robert
ATTORNEY

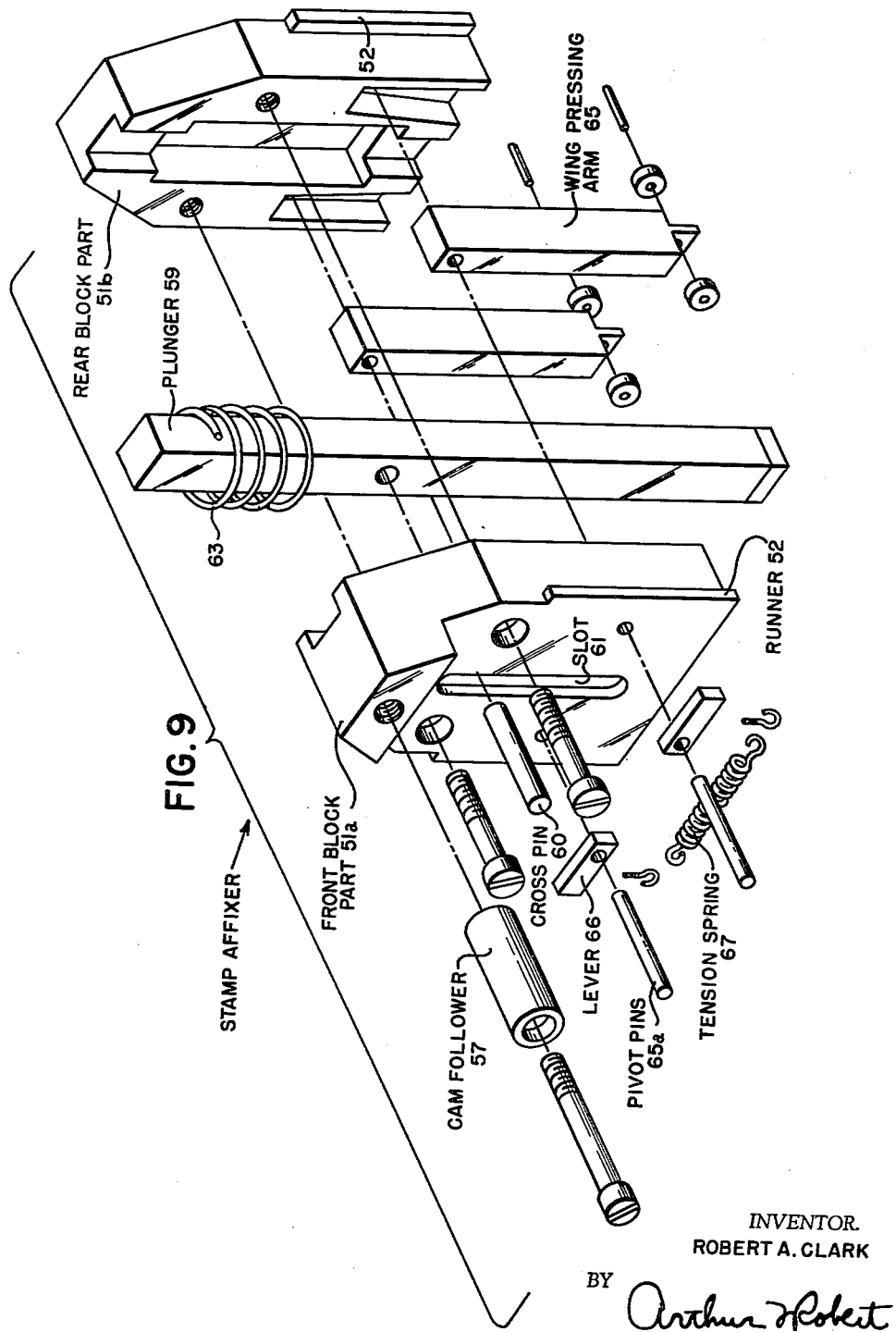

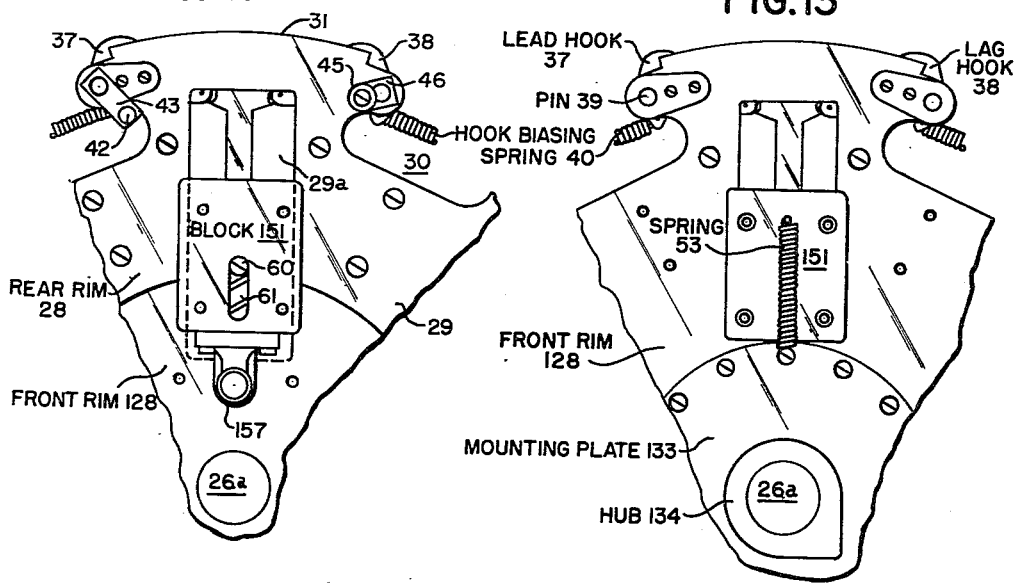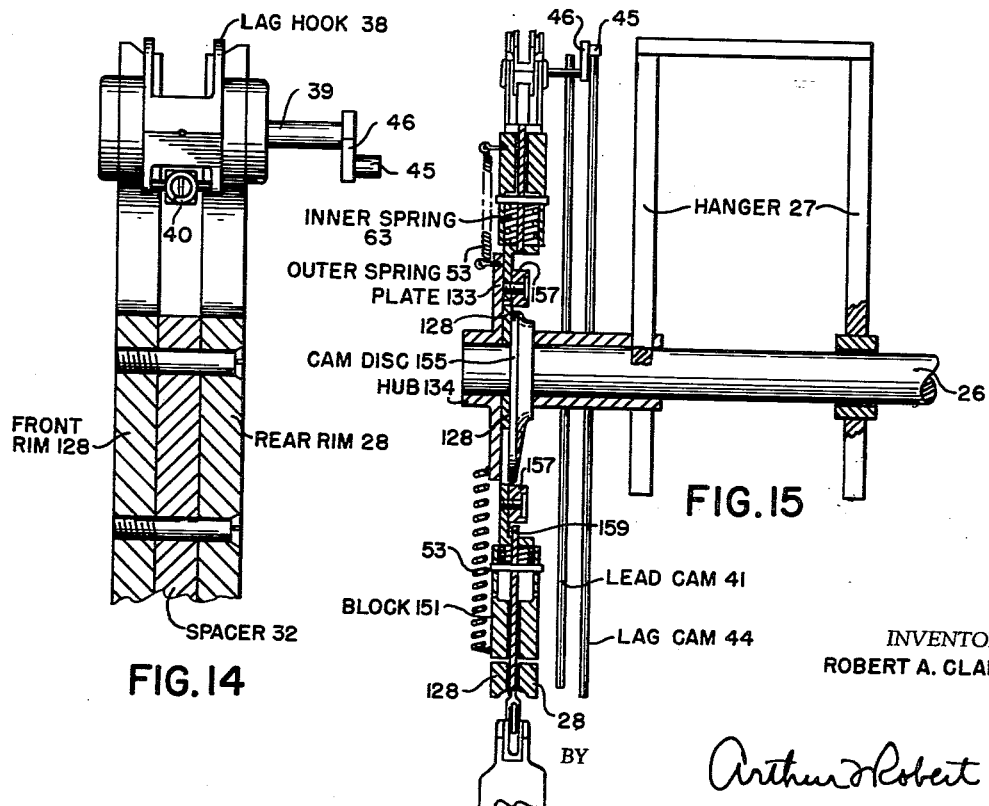

Aug. 14, 1962 R. A. CLARK 3,049,166
STRIP STAMP APPLYING AND SQUEEZING MECHANISM
Filed March 18, 1960 8 Sheets-Sheet 7
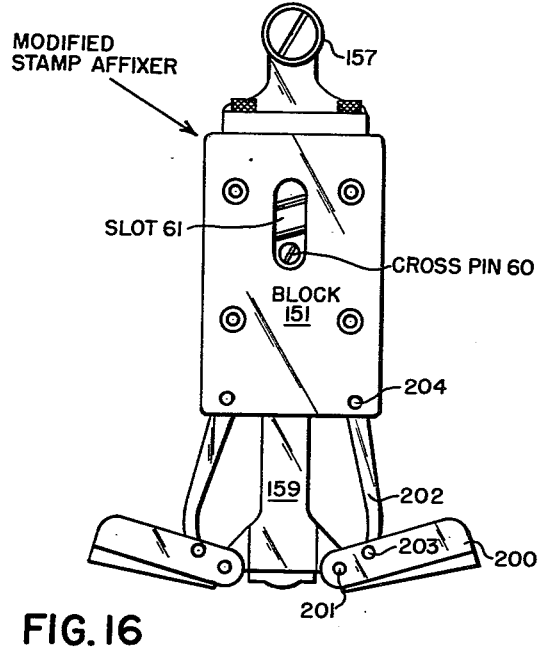
FIG. 16
FIG. 17
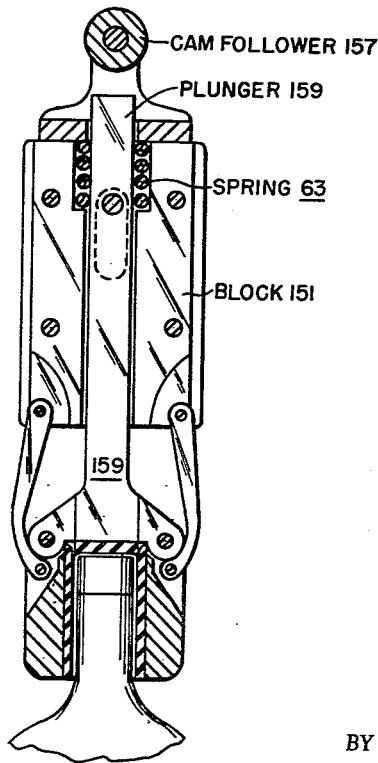
INVENTOR
ROBERT A. CLARK
BY Arthur H. Robert
ATTORNEY Aug. 14, 1962   R. A. CLARK   3,049,166
STRIP STAMP APPLYING AND SQUEEZING MECHANISM
Filed March 18, 1960   8 Sheets-Sheet 8
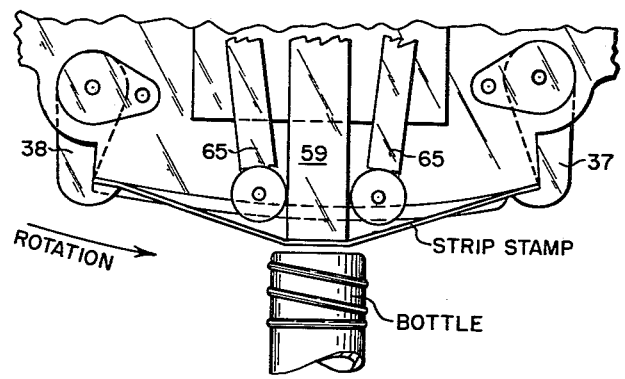
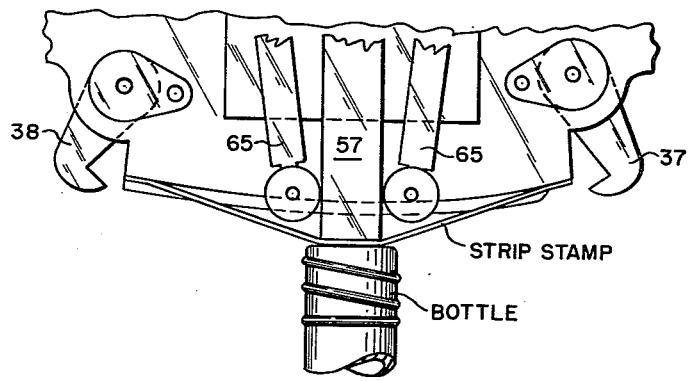
INVENTOR.
ROBERT A. CLARK
BY
Arthur Robert
ATTORNEY

United States Patent Office 3,049,166
Patented Aug. 14, 1962

3,049,166
STRIP STAMP APPLYING AND SQUEEZING MECHANISM
Robert A. Clark, Owensboro, Ky., assignor to Glenmore Distilleries Company, Owensboro, Ky., a corporation of Delaware
Filed Mar. 18, 1960, Ser. No. 16,103
23 Claims. (Cl. 156—489)

In bottling taxable beverages, such as whiskey, it is customary to convey the bottle successively through a number of areas including: a filling area wherein a filling machine fills the bottles; a capping area wherein a capping machine closes the top of the bottle with a cork, screw cap or friction cap closure; a labeling area wherein labeling apparatus applies the appropriate labels which may include front, back and neck labels; a strip (tax) stamp applying area wherein a stamp applicator applies the mid-portion of a strip stamp across the top of the bottle and presses the end portions thereof downwardly against the neck of the bottle; a stamp squeezing area wherein one or more operators manually engage the neck of each bottle one or more times to squeeze the stamp so as to insure its firm adherence to the bottle; an inspection area wherein the finished bottles are inspected for the presence of visible impurities in the bottle and of proper labels and tax stamps and for other purposes; and a packaging area wherein the bottles are packaged in cases.

An apparatus conventionally employed in the stamp applying and squeezing areas comprises: (1) a stamp magazine; (2) a cam-controlled vacuum finger to remove an individual stamp from the magazine at the stamp supply area; (3) a vertically arranged stamp gluing wheel which is positioned to rotate its periphery endlessly through said stamp supply area, a gluing area and a needle transfer area, and which is operative to receive and grip a stamp from the vacuum finger at the stamp supply area, carry that stamp through a gluing area where an adhesive is applied to it and ultimately convey it to the needle transfer area; (4) an endless needle conveyor which is positioned for movement through the needle transfer area and a stamp applying area and which is operative, in the needle transfer area, to pierce the ends of the wheel-gripped stamp with a pair of needles immediately before that stamp is released by the wheel, remove that stamp from the wheel when released and carry it to the stamp applying area and there center it over the top of the bottle; and (5) a rotary strip stamper having a frame, which is positioned to rotate its periphery horizontally through said stamp applying area and a stamp squeezing area, and a stamp affixer and squeezer mounted on said frame adjacent its periphery for rotational movement therewith and for vertical movement relative thereto, said affixer and squeezer being operative (a) in the stamp applying area to transfer a centered stamp from the needle conveyor to the bottle by moving downwardly to press the center of the stamp downwardly against the top of the bottle and to swing the end portions or wings of the stamp downwardly and inwardly against the neck of the bottle and, (b) in the stamp squeezing area, to remain down so as to continue in a static manner to press the top of the stamp and squeeze the wing portions thereof against the top and neck portions of the bottle.

In the foregoing apparatus, the transfer needles perforate the stamp which permits glue to pass through the stamp during the stamp applying operation. This is objectionable because such glue spreads over the stamp affixer and squeezer thus rendering its stamp applying operation less effective and necessitating relatively frequent cleaning operations. Additionally, the strip stamper is a cumbersome, complicated and expensive mechanism which takes up considerable space, requires considerable maintenance and is capable of handling no more than one line of bottles at a somewhat limited speed. Furthermore, it cannot process the bottles on a straight line bottle conveyor but necessitates the movement of the bottles along an open loop path extending around its periphery. As a result, additional mechanism is required to transfer the bottles from a straight line bottle conveyor into the receiving end of that path and from the delivery end of that path back to a straight line bottle conveyor.

The principal objects of the present invention are: to overcome the foregoing objections to a substantial degree and, more particularly, to eliminate the use of transfer needles or other stamp perforating devices and to provide a small compact, simple and relatively inexpensive mechanism which can be operated on a straight line bottle conveyor at a faster pace and which can be easily and simply arranged in one or more units to handle one or more lines of bottles.

Another important object is to provide a strip stamp applying mechanism which can be easily and quickly removed and replaced.

Another important object is to provide means for tensioning the stamp in the squeezing area in a manner promoting firm adherence to the bottle and a smooth neat appearance.

The principal objectives of my invention may be accomplished by performing the stamp applying and stamp squeezing operations on separate affixing and squeezing assemblies; mounting the stamp affixer on the stamp gluing wheel in position to transfer the stamp directly from the wheel to the top of a bottle on the bottle line conveyor; and mounting the stamp squeezer on a separate conveyor extending adjacent and parallel to the bottle line conveyor in position to squeeze stamps on the bottles carried by that conveyor. With this arrangement, the bottles remain on the bottle line conveyor as it passes successively through the applying and squeezing areas.

In the applying area, the stamp affixer can be quickly operated to transfer a stamp from the gluing wheel directly to the top of a bottle, press its wings against the neck of a bottle and return to its normal position on the stamp wheel.

In the squeezing area, the stamp squeezer can be readily operated at the beginning of that area to press the top of the stamp against the top of a bottle and simultaneously squeeze the wings of a stamp against the neck of a bottle, to remain in that position to the end of the squeezing area and to return to its original inoperative position at the end of the squeezing area.

Since the bottle remains on the bottle line conveyor, it is a relatively simple matter to center each bottle in a fixed position on that line conveyor as it travels through these areas by means of a clamping conveyor in the form of an endless chain carrying a succession of pairs of bottle clamping jaws. It is also a relatively simple matter to mount this combination stamp gluing and applying wheel on one end of a shaft from which it may, as a whole, be easily and quickly removed and replaced. I have also found that by raising the line conveyor a friction of an inch during its travel through the squeezing area and holding it at this elevation until it is released by the squeezing jaw assembly, the center of the stamp will be moved upwardly by the bottle while the wings of the stamp are somewhat restrained against such movement by the squeezing mechanism. As a result, the stamp is stretched into a smooth condition which promotes firm adherence and a neat appearance.

The invention is illustrated in the accompanying drawings wherein:

FIG. 1 is a somewhat schematic side elevational view of a stamp applying and stamp squeezing apparatus constructed in accordance with the present invention;

FIG. 2 is a somewhat schematic top plan view of the design shown in FIG. 1;

FIG. 3 is a partly broken front elevational view of the stamp (receiving and conveying) wheel or stamp gluing wheel;

FIG. 5 is a fragmentary enlarged section corresponding to one taken along line 5—5 of FIG. 3;

FIG. 6 is a perspective view of the fragmentary structure shown in FIG. 5;

Figure 4:
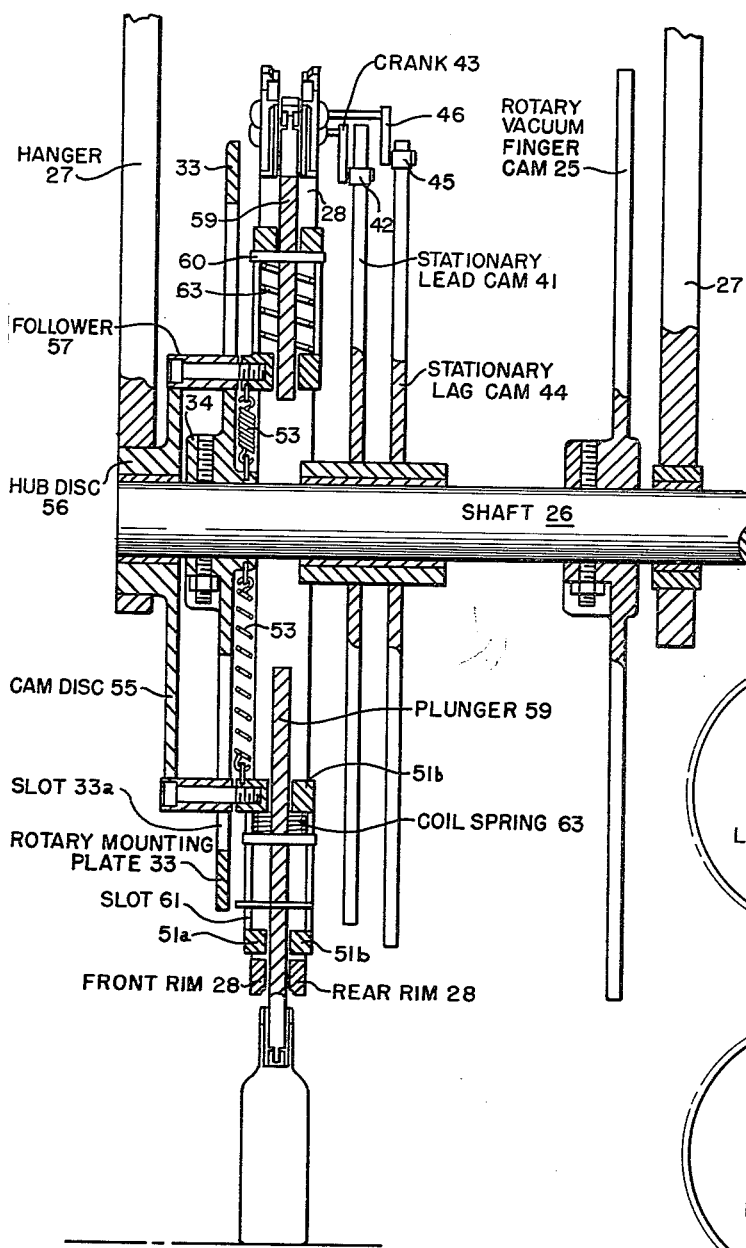
FIG. 4 is a section corresponding to one taken along line 4—4 of FIG. 3 to show the stamp wheel and associated cams and hangers, omitting many details for the sake of clearness.
Figure 7:
Figure 8:
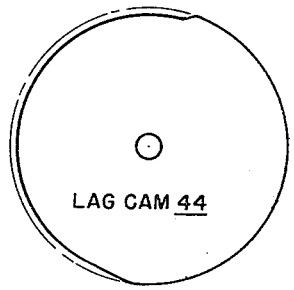

FIGS. 7 and 8 are face views of the lead and lag cams used in operating the stamp gripping hooks such as the lag hooks 38 shown in FIGS. 5 and 6;

FIG. 9 is an exploded view of the stamp affixer;

FIG. 10 is an enlarged fragmentary view of the stamp squeezing means showing a stamp squeezer in its squeezing position;

FIG. 11 is an enlarged fragmentary detail of the mechanism for opening the wing pressing arms 65 as they move into their lowermost position;

FIG. 12 is an elevational view of a fragmentary (⅙) rear face view of a portion of a modified stamp wheel construction including a modified stamp affixer, the rest (⅚) of this modified wheel repeating the structure shown in FIG. 3;

FIG. 13 is a fragmentary front face view corresponding to FIG. 12;

FIG. 14 is a fragmentary view of this modified wheel corresponding to FIG. 5 of the first wheel;

FIG. 15 is a vertical sectional view of the modified stamp or gluing wheel and associated cams and hangers, this view corresponding to FIG. 4 of the first wheel;

FIG. 16 is a front elevational view of the modified stamp affixer in its inoperative position;

FIG. 17 is a front view of the same stamp affixer in its fully extended position with the front face of the block 151 removed; and FIGS. 18 and 19 are enlarged elevational views of a fragmentary portion of the stamp wheel and the adjacent outer end portion of the stamp affixer of FIGS. 1–11, these views illustrating the stretching of a stamp during its transfer from the stamp wheel to the top of a bottle and showing the relative positions of the various parts immediately before and after the stamp wheel releases the stamp.

EMBODIMENT FIGS. 1–11

The apparatus shown in FIGS. 1 and 2 embraces only the stamp applying and squeezing areas. This apparatus, as illustrated, comprises seven elements, viz: (1) a bottle line conveyor for conveying the bottles along a predetermined first path extending through the stamp applying and squeezing areas; (2) means for clamping each bottle centrally in a fixed position on the conveyor as it moves through said areas; (3) a strip stamp magazine; (4) means for withdrawing individual strip stamps from the magazine; (5) gluing wheel means for receiving an individual strip stamp from the withdrawing means, conveying it along a predetermined second path to the application area where it is to be applied to a bottle and applying an adhesive to the stamp during its travel along said second path; (6) a stamp affixer mounted on the gluing wheel means for relative radial movement, said affixer means being operative, as a bottle passes through the application area, to press the mid-portion of a stamp upon the top of the bottle and to swing and squeeze the end portions of said stamp upon the neck of said bottle; and (7) a stamp squeezer, operative as the bottle passes through the stamp squeezing area, again to press or squeeze the end portions of the stamp against the neck of the bottle.

The bottle conveying and clamping means of items 1 and 2, the magazine of item 3, the stamp withdrawing means of item 4 and the gluing wheel means of item 5 are all conventional whereas the stamp affixer of item 6 and the stamp squeezer of item 7 are constructed and arranged in accordance with the present invention.

Conventional Bottle Line Conveyor

The conveying mechanism, as seen in FIGS. 1–2, includes a conventional steel belt conveyor 10 supported on some suitable conveyor table 11 and conventionally associated with a spacing worm 12 and a timing wheel 13 which cooperate to deliver bottles to the clamping mechanism at properly timed intervals.

Conventional Bottle Clamping Mechanism

Generally speaking, the bottle clamping mechanism, as seen in FIGS. 1–2 and 10, comprises: a sprocket 15 at the left or receiving end of the stamp applying area; a sprocket 16 at the discharge or delivery end of the squeezing area; an endless chain 17 horizontally arranged around sprockets 15 and 16 at a level slightly above that of belt 10; a succession of cooperative pairs of clamping jaws 18 mounted on the chain 17 so as to swing away from each other into their bottle receiving position as the chain 17 passes around the receiving sprocket 15 and to close upon the bottle as the chain 17 leaves the sprocket 15, these clamping jaws once again opening toward the end of the squeezing area when the chain passes around a guide roll 19.

Conventional Stamp Supply and Withdrawal Means

As best seen in FIG. 1, the stamp supply and withdrawal apparatus comprises a magazine 21 containing a stack of stamps 22. The magazine is open at its bottom end to permit the individual stamps to be removed, one at a time, by a conventionally operated mechanism which includes: a vacuum finger 24 (see FIG. 4), controlled by a vacuum finger cam 25 fixed to shaft 26; and other parts not shown. Before passing, it may be noted that the shaft 26 is rotationally supported upon a spaced pair of frame members or hangers 27.

Conventional Gluing Wheel Means

The gluing wheel means functions to grip a strip stamp fed or transferred to it from the vacuum finger 24 and convey it to and release it at a point where it is directly centered over the bottle. As indicated in FIGS. 3 and 4, it comprises: (a) a stamp wheel mounted on shaft 26 for rotation therewith; (b) stamp gripping means mounted on the wheel; (c) means for operating the gripping means to grip a stamp at the stamp feeding point and to release it when the wheel carries it to and centers it directly over the top of a bottle; and (d) means to apply an adhesive to the stamp between the stamp receiving and releasing points.

The stamp wheel, as seen in FIGS. 1–6, comprises: (a) a pair of laterally spaced disc-like (front and rear) rims 28, each rim extending concentrically around shaft 26 and having a serrated bore characterized by twelve inwardly directed tooth-shaped segments 29 alternating with twelve square cut inwardly-open recesses 29a and a periphery characterized by twelve outwardly-open recesses 30 alternating with twelve lands 31, each recess being centered in the radial plane of the corresponding tooth segment 29 and each land 31 extending from one recess 30 to the next; (b) means rigidly interconnecting the rims, this means being in the form of spacers 32, one bridging the gap extending axially between each tooth-shaped segment 29 in one rim 28 and the corresponding segment 29 in the other rim and one or more securing screws (not shown) integrating the spacers and rims; and (c) means mounting the rims 28 on shaft 26 for rotation therewith, this means including a disc-like mounting plate 33 having a hub 34 through which it is fixedly mounted on shaft 26 in slightly spaced relation to the front side of the front rim, and a series of screws 35, one extending from each tooth-shaped segment 29 axially over to the disc-like mounting plate 33 and being rigidly connected to both. Plate 33 also contains twelve slots 33a.

Before passing, it may be noted: that each land 31 is of general L-shape in cross-section; and that the toe end of each L is adjacent to the open gap between a land on one rim and the corresponding land of the other rim so that the feet of opposite L's provide the gap with strip-like margins.

The stamp gripping means includes a lead hook 37 in the recess 30 at the lead end of each land 31 and a cooperating lag hook 38 in the peripheral recess 30 at the lag end of each land, each hook being mounted on an adjacent cross pin 39 for movement from a closed position, in which it clamps the adjacent end of a strip stamp to the strip-like margin of the adjacent land, and an open position in which it releases the stamp. As a matter of fact, while only one lead hook and one lag hook are necessary for use at each end of each land, two of each are preferred and illustrated.

The operating means for opening and closing the gripping means comprises: a spring 40 biasing each hook toward its closed position; a stationary lead cam 41 controlling the operation of all lead hooks 37 through a cam follower 42 and a crank 43 interconnecting the cam follower to the pin 39 on which the lead hook 37 is mounted; and a stationary lag cam 44 with corresponding cam follower 45 and interconnecting crank 46. Whether the lead and lag hook close simultaneously or successively at the stamp receiving area depends on the manner in which a strip stamp is fed to it, because each of these hooks should close as soon as the corresponding end of the strip stamp is in position to be clamped. At the application area, lead and lag hooks are opened simultaneously.

The stamp gluing mechanism comprises: a glue pot 48; and an application roller 49 positioned to receive glue from the pot 48 and to roll it on a stamp as the stamp passes it.

*Stamp Affixer*

The stamp affixer operates to push the mid-portion of a strip stamp away from the wheel and pin it against the top of a bottle while forcing the wings of the stamp downwardly along opposite sides of the neck of the bottle. The affixer illustrated comprises: (a) a block mounted on the wheel for rotation therewith and for radially slidable extension-retraction movement relatively thereto; (b) an outer block-retracting spring normally holding the block in its inwardly retracted position; (c) cam means extending the block outwardly as it approaches the center of the stamp application area; (d) a plunger centrally mounted in the block for movement therewith and for radially slidable movement relatively thereto; (e) inner plunger-extending spring means normally holding the plunger with its outer end projecting from the block but not from the wheel when the block is fully retracted while projecting from both sufficiently to engage and press the mid-portion of a stamp onto the top of a bottle when the block is partially extended, said plunger thereupon being held by the top of the bottle against further movement while permitting the partially extended block to complete its extension movement; and (f) wing pressing means carried by the block in position to engage the wings of a stamp when the block is partially extended and to utilize the final portion of the block extension movement to press the wings of the stamp against the neck of the bottle.

The block 51 may be fashioned in any suitable shape. As illustrated, it comprises two complementary front and rear parts which are individually designated 51a and 51b. The front part 51a is inserted through the front face of its front rim 28 to fit within the recess 29a formed by the adjacent sides of adjacent tooth segments 29 while the rear part 51b is inserted through the rear face of the rear rim whereupon the two parts are then bolted together. These parts are retained on the wheel by runners 52 at the front and rear vertical corners of the block as a whole. The block 51 may be slidably moved radially between predetermined extended and retracted positions.

The block is normally held in its retracted position by a spring 53 which interconnects the front side of the block with the rear hub 34 of the wheel mounting plate 33 as seen in FIG. 4.

The cam means for extending the block is in the form of a disc 55 having a hub 56 which, while it encircles the shaft 26, is not connected to the shaft for rotation therewith but, on the contrary, is fixedly mounted on the front hanger 27 of the frame. Cam 55 has a cam-shaped periphery which engages a cam follower 57 carried by the block and projecting from the front face thereof axially through slot 33a. Cam 55 permits the spring 53 to retract the block shortly after it leaves the center of the application area and to hold it retracted for approximately 330° of its movement around the shaft. In other words, the cam 55 extends the block during the last 30° more or less of its approaching movement toward the center of the application area. (See FIG. 3.)

The plunger 59, which is centrally mounted within the block for radial movement, carries a cross pin 60 which extends into a slot 61 in the front face of the block 51, this slot limiting the radial range of movement of the plunger.

A normally expanded coil spring 63, encircling the inner end of the plunger 59, normally holds the plunger in its fully extended position, in which its cross pin 60 engages the outer end of slot 61 while the outer end portion of plunger 59 projects outwardly between the rims from the outer end of the block to a point slightly beyond the outer end of the segment recess 29a (between segments 29) within which the block slides.

At this point, it may be noted that, when the block 51 reaches a position at which the block-extending cam 55 becomes operative to institute the extension movement, the entire block assembly including plunger 59 will move outwardly as a fixed unit until the outer end of the plunger projects, beyond the periphery of the wheel as a whole, sufficiently to engage the mid-portion of a strip stamp and press it downwardly against the top of a bottle which is closely approaching the center of the application area. As a result of this engagement, the top of the bottle prevents the further outward movement of the plunger without interfering with the further outward extension of the block.

Accordingly, as the bottle and the gluing wheel both complete their respective movements which are required to align the vertical center of the bottle and the radial center of the operative stamp affixer simultaneously with the center of the application area, the plunger-biasing coil spring 63 will be compressed while the block 51 will also complete its outward extension, reaching full extension at or about the center of the application area.

The wing pressing means, which is carried by the block, utilizes this final portion of the block extension movement to press the free end portions of the stamp against the neck of the bottle.

The wing pressing means comprises a pair of wing pressing arms 65 pivoted to the block on opposite sides of the plunger 59 and projecting outwardly from the outer end of the block to a degree almost equalling that of the plunger before the block is extended. The wing pressing arms 65 are resiliently urged toward each other to press yieldably against opposite sides of the plunger 59. To this end, the outer front ends of the pivot pins 65a, on which the arms 65 are mounted, are provided with fixedly mounted levers 66, which are interconnected by tension spring 67.

With this arrangement, after the plunger 59 strikes the top of a bottle and when the block 51 begins to extend relatively to the plunger, the arms 65 will likewise be extended relatively to the plunger and thus brought into engagement with the free end portions or wings of a stamp on the top of the bottle. As the extension movement continues, the stamp pressing arm 65 will roll downwardly along the opposite sides of the neck of the bottle pressing the free end portions of the stamp into contact with the bottle neck. Immediately before the lowermost position of the arms 65 is reached, the outer or free ends of the levers 66 engage pins 68 (see FIG. 11) projecting from the rear face of the wheel mounting plate 33 to force the arms apart (against the action of spring 67) and thereby avoid any interference with the continued movement of the bottle. Coincident with the outward spreading movement of the arms 65, the block-extending cam 55 permits the springs 53 to retract the block more or less instantly and fully and thereby remove the arms 65 from the vicinity of the stamped bottle.

Stamp Squeezer

After a stamp is initially applied to a bottle and pressed against the neck, its wings seldom stay in place. Heretofore, it has been the practice either: to allow the arms 65 of the affixer to remain in their stamp squeezing position over a squeezing interval of predetermined duration; or to grasp the neck of a freshly stamped bottle and squeeze it manually to force the stamp back into complete engagement with the neck. Usually, after one or two manual squeezing operations of momentary duration, the stamp stays permanently in place.

In accordance with the present invention, this stamp squeezing operation is performed by a separate stamp squeezing means operating automatically to engage opposite stamp-bearing sides of the neck of a bottle at the beginning of the squeezing area to maintain a squeezing pressure thereon as the bottle passes through a squeezing area of desired length and to release the neck at the end of that area. Broadly speaking, this mechanism may be constructed with horizontally arranged jaws operating in the fashion of the clamping mechanism. Preferably, it is provided with vertical jaws which may be arranged to wipe the stamp as they move downwardly into their final squeezing position.

The preferred form of stamp squeezing means comprises: a horizontally arranged carrier; a stamp squeezer slidably mounted on the carrier for movement between an upper inoperative position and a lower bottle-neck squeezing position, said squeezer having stamp-squeezer jaws; and cam means to move the squeezer vertically and actuate its jaws for squeezing purposes.

The horizontally arranged carrier 70 is in the form of a pair of horizontally-extending vertically-spaced sprocket-supported endless chains (also designated 70) mounted on frame-supported sprockets located at opposite ends of the squeezing area. Each chain 70 has a squeezing run extending parallel to the path of the bottle movement through the squeezing area and moving in the same direction and a return run. The lower chain 70 is mounted at an elevation higher than that of the endless chain 17 of the clamping mechanism. These chains cooperate to carry a supporting frame 71 which extends vertically along the outer faces of both chains and is secured to both.

The squeezer, which is slidably mounted on the supporting frame 71 for vertical movement, comprises: a slide bar 73 slidably secured to the supporting frame 71 for such movement; a block 74 integrally secured on its rear side to the front face of the slide bar; a pair of vertically-extending jaws 75 pivotally mounted, along their mid-portions, to opposite vertical sides of the block 74; a plunger 76 extending downwardly from the lower end of the block 74 and mounted on that block for relative extension and retraction movement; and a spring 77 resiliently extending that plunger. It will be understood that the vertical movement of the squeezer is sufficient to enable its jaws 75 to clear the top of the bottle in the operative position and to squeeze the lower end portions of the wings of a stamp on the bottle in the lowermost squeezing position.

The cam means includes a frame-mounted endless channel cam 80 corresponding horizontally in contour to the sprocket-supported chains 70 of the carrier and arranged, relative to the slide bar 73 of the squeezer, in position to receive a cam follower 81 which is carried on a trunnion projecting from the rear face of the slide bar 73. This channel cam 80 functions to hold the squeezer in its upper inoperative position as it moves from the discharge end of the squeezing area along the return run path back to the receiving end of that area where it declines as it passes forwardly through the receiving end of the squeezing area to lower the squeezer to its lowermost position. Cam 80 then holds the squeezer in its lowermost position, during its travel through the mid-portion of the squeezing area, and then, as the squeezer passes through the discharge end portion of the squeezing area, cam 80 inclines it as it moves forwardly until it reaches its inoperative position. The lower end of the squeezing jaws 75 are normally biased apart, by spring means not shown, sufficiently to pass over the neck of a bottle while remaining closely adjacent to the opposite sides thereof.

In order to move these jaws into squeezing position, a cam mechanism is provided comprising: a plunger 83 extending upwardly from the upper end of the block 74 and mounted on that block for relative extension and retraction movement; a spring 84 resiliently extending that plunger; a delta cam 85 mounted on the upper end of a plunger 83 for movement therewith and operative, when the plunger moves downwardly, to engage and spread apart the upper ends of the squeezing jaws 75 and thereby correspondingly close their lower ends; and a frame-mounted (main jaw-closing) cam 86 extending along the squeezing area in position to force the plunger 83 and its delta cam 85 downwardly to the extent necessary to cause the squeezing jaws 75 to squeeze the neck of a bottle with the desired or requisite force and to maintain this squeezing action as the bottle passes through the squeezing area.

If desired, the jaw-closing cam 86 could be arranged to institute the jaw closing movement before the squeezer reaches its lowermost position so that the squeezing jaws would engage the wings of a stamp as they move downwardly and wipe these wings downwardly. Preferably, the main jaw-closing cam 86 is arranged to effect the closing operation after the squeezer reaches its lowermost position in which event the squeezing jaws initially function only to exert a squeezing pressure on the wings of the neck of the bottle. To this end, the jaw-closing cam 86 has a declining section positioned, at the beginning of the squeezing area, so that its final jaw-closing operation occurs when the lowering operation of the squeezer is completed. Needless to say the jaws 75 should not be closed until they have been lowered enough to engage the cap or cork portion of the neck. The jaw-closing cam 86 should and, as illustrated, does terminate adjacent the point where the channel cam 80 inclines upwardly as it passes through the discharge end portion of the squeezing area.

In further accordance with my invention the bottle line belt conveyor 10 is made to rise between 1 and 2/32 (say 3/64) of an inch as it travels through the squeezing area. This raises the bottle a corresponding amount. However, since the squeezing jaws remain stationary, they tend to restrain the upward movement of the stamp as a whole with the bottle. As a result, the stamp is stretched into a smooth wrinkle-free condition and forced into close and firm adherence to the bottle throughout its full extent. As a consequence, it has a very neat appearance.

Operation

In preparing for operation, the elevation of the table 11 is adjusted to a desired elevation through the agency of crank 90 and table jacks 91. The drive motor 92 is started to drive the conveyor 10, the timing wheel 13, the bottle clamping mechanism, the stamp affixer, the stamp squeezing means and the other requisite parts in timed relationship.

As a capped bottle on conveyor 10 approaches the strip stamp application area, the vacuum finger 24 will be operated to remove a stamp 22 from magazine 21 and deposit it upon the periphery of the gluing wheel and, more particularly, upon the adjacent peripheral land 31. As this deposit is made, the lead hook 37 is closed through the action of lead cam 41 and follower 42 to grip the lead end of the stamp. At the same time, or shortly subsequent thereto, the lag hook 38 will be operated by lag cam 44 and cam follower 45 to clamp the lag end of that stamp.

With continued movement of both wheel and bottle, the stamp passes the gluing means 48, 49 which functions to apply an adhesive to its outwardly facing surface.

The stamp affixer on the wheel remains in a retracted position until the wheel has carried the stamp to a position wherein the (transverse) center of the stamp is spaced about 30° from the center of the application area on the approaching side. As the wheel continues to carry the stamp from this 30° advance position toward the center of the application area, the cam-shaped disc 55 will operate through cam follower 57 to start the extension movement of the stamp affixer. During the initial portion of this extension movement, the plunger 59 will engage the center of the stamp and push it outwardly away from the periphery of the wheel onto the top of a bottle. When this occurs, further outward movement of the plunger is prevented.

Now, as the stamp gluing wheel completes its rotary movement, to bring the transverse center of the stamp into alignment with the center of the application area, the block 51 on that wheel will complete its relative radial extension movement. In doing so, it carries the wing pressing arms 65 radially outward causing them to engage and move the wings of the stamp outwardly. As a result, the wings swing downwardly along opposite sides of the neck and are progressively pressed by the downwardly moving arms 65 into firm contact with the neck of the bottle.

Just as the arms 65 move into their lowermost position, the levers 66, on the pivot pins of the wing pressing arms 65, engage the pin 68 to spread the arms 65 apart and thus cause them to disengage the neck of the bottle. At this time, the block retracting spring 53 becomes operative to retract the affixer back to its fully retracted position which is accomplished with a more or less snap spring action. This completes the extension and retraction operations of the affixer, which are required to effect the initial application of a strip stamp on a bottle. Accordingly, the bottle now leaves the stamp application area to enter the squeezing area.

The bottle, which was held by the clamping mechanism as it traveled through the application area, continues to be held by that mechanism as it travels through the squeezing area. As the bottle moves through the receiving end portion of the squeezing area, the carrier 70 of the stamp squeezing means moves a stamp squeezer in timed relationship with that bottle. As a result, the channel cam 80 lowers the slide bar 73, block 74 and associated parts toward that bottle. At the end of the first part of this lowering movement, the lower plunger 76 strikes and is stopped by the top of the stamped bottle. As the lowering movement is completed, channel cam 80 will cause slide bar 73, block 74 and associated parts to continue declining to their respective lowermost positions.

The jaw closing cam 86 operates, through the delta cam 85 and upper plunger 83, to close the squeeze jaws 75 upon the neck of the bottle either: when the lowering movement is completed so as to cause the jaws to squeeze the wings of a strip stamp against the neck of the bottle. Once the jaws are in this final squeezing position, they remain there while the bottle travels to the discharge end portion of the squeezing area. During this travel, the bottle line conveyor belt 10 rises to effect the stamp smoothing operation. At the end of the squeezing area, the jaw closing cam 86 releases the upper plunger 83 permitting the jaws 75 to spring open while the channel cam 80 raises the squeezer upwardly to its inoperative position. The clamping mechanism now frees the bottle for movement into the inspection area.

EMBODIMENT OF FIGS. 12–17

This embodiment is composed of two elements corresponding to the fifth and sixth elements of the embodiment of FIGS. 1–11. These elements comprise: (5) the stamp gluing wheel; and (6) the stamp affixer. In the receiving and conveying means, only the structure of the stamp gluing wheel is modified, the stamp gripping means and means for operating the gripping means remaining the same. In the stamp affixer, the structure as a whole is modified. In the following description, only the modified structure is described.

Modified Stamp Wheel

The modified stamp gluing wheel comprises: (a) a disclike rear rim 28 which is substantially unchanged; (b) a front disc 128 which has an outer portion corresponding to rear rim 28 and a solid inner portion in place of the serrated bore or rear rim 28, this inner portion having a small central opening 26a to receive shaft 26; (c) means rigidly interconnecting the rear rim 28 and the front disc 128, this means being in the form of tooth-shaped spacers 32, for bridging the gaps extending axially between the tooth shaped segments 29 in rear rim 28 and a corresponding portion of the front disc 128, with one or more securing screws integrating the rear rim 28, spacers 32 and front disc 128 into a wheel-like structure; (d) means mounting this wheel-like structure on shaft 26 for rotation therewith, this means including a disc-like mounting plate 133, having a hub 134 through which plate 133 is fixedly mounted on shaft 26 in abutting face-to-face relationship with the front side of the front disc 128 and suitable number of screws securing disc 128 upon plate 133.

It will be understood that the inner and outer portions of front disc 128 cooperate to form a single solid disc which is imperforate except for (a) the center shaft opening 26a, (b) six symmetrically-spaced square-cut recesses, which correspond to the square-cut inwardly-open recesses 29a located in the rear rim 28 between its teeth 29, and (c) screw, bolt or pin receiving openings.

Modified Stamp Affixer

This modified mechanism comprises: (a) a block 151 mounted on the gluing wheel for rotation therewith and for radially slidable extension-retraction movement relatively thereto; (b) an outer block-retracting spring 53 normally holding the block in its inwardly retracted position, this spring extending from the block 151 to the stamp wheel mounting plate 133; (c) cam means extending the block outwardly as it approaches the center of the stamp application area, including cam disc 155 stationarily mounted on shaft 26 at the rear side of front disc 128 and cam follower 157 mounted on the block 151; (d) a plunger 159 centrally mounted within the block for movement therewith and for radially slidable movement relatively thereto; (e) inner plunger-extending spring means 63 normally urging the plunger 159 outwardly and normally holding it with its outer end projecting from the block but not from the wheel when the block is fully retracted while projecting from both sufficiently to engage and press the midportion of a stamp onto the top of a bottle when the block is partially extended, said plunger then thereupon being held by the top of the bottle against further outward movement while permitting the partially extended block to complete its extension movement; and (f) modified wing pressing means to press the wings of the stamp against the neck of the bottle during the final extension movement of the block.

The wing pressing means comprises: a pair of jaws 200, each pivoted at 201 to the projecting outer end of plunger 159, one at each side thereof; and a pair of levers 202, one for each jaw 200, each lever extending between a mid portion of its jaw and the adjacent end of the block 151 and being pivotally connected to both through its jaw pivots 203 and block pivots 204. When the inner spring 63 is fully extended, it holds the plunger 159 in a predetermined outwardly projecting position. In such position, each lever 202 is operative to hold its jaw 200 outstretched, i.e., more or less at right angles to the long axis of plunger 159, as will be seen in FIG. 16.

When the outer end of the plunger is engaged by the top of a bottle and forced to retract inwardly toward the block 151, the levers 202 continue to hold their jaws pivots 203 in their same outer positions while plunger 159 now moves its pivotal connections 201 with jaws 200 inwardly toward the block. As a result, each jaw 200 swings about its lever pivot 203. Consequently the jaws now move toward opposite sides of the neck of the bottle. In doing so, they engage the outspread wings of a stamp 22 on the top of a bottle and swing them inwardly toward the neck of the bottle. This movement proceeds rapidly in its last stages and, of course, presses the wings of the stamp against opposite sides of the bottle. However, as soon as cam follower 157 is permitted to move radially inward toward shaft 26, the outer block-retracting spring 53 becomes effective to remove jaws 200 quickly out of contact with the bottle and to restore them to their outwardly spread position illustrated in FIG. 16.

The foregoing subject matter was obtained in part from my application Serial No. 804,192, filed April 6, 1959 and now abandoned, and, with the following subject matter, constitutes a continuation-in-part thereof.

*Stamp Transfer Feature*

In the FIGS. 1–11 embodiment, the plunger 59 tends to stretch a strip stamp during the act of transferring that stamp from the gluing wheel to the top of a bottle by moving the center of that stamp radially outward while the ends of the stamp remain anchored on the gluing wheel by the grippers 37, 38, which finally open to release the stamp wings at a moment approximating the very moment the center of the stamp is pressed firmly against the top of a bottle. This action is illustrated in the drawing wherein:

FIGS. 18 and 19 show the relative positions of the various parts immediately before and immediately after the grippers open.

As a result of the foregoing action, my stamp transfer mechanism does not lose control of the stamp during the transfer, as might be the case if the grippers released the stamp long before the projecting hard-rubber end of the plunger pressed it firmly against the top of the bottle. The stretching of the stamp during its transfer has a number of advantages including: (1) it insures that the top of the stamp is not wrinkled when it is pressed against the top of the bottle; (2) it causes the wings of the stamp to be held in a wrinkle-free outwardly-stretched condition and in a centered position up to a moment approximating the very moment the center of the stamp is anchored firmly on the bottle; (3) it releases the wings of the stamp at or about (and preferably immediately preceding) the moment they are engaged by the rollers on arms 65; and (4) it releases the wings of the stamp in a centered position in which they are properly aligned with the neck of the bottle and, in that way, promotes (a) the movement of those wings to a properly aligned or centered position on the neck of the bottle and (b) the arrival of those wings at that position in a wrinkle-free condition.

The rapid rotation of the gluing wheel necessitates a nearly instantaneous down-and-up thrust of the wing pressing means or arms 65 because the hard rubber rollers on arms 65 must travel an appreciable distance downwardly along the neck of the bottle and, when spread apart, return an equal distance in a time small enough to prevent the advancing side of the bottle from hitting the adjacent roller. With the gluing wheel of the first embodiment operating on "tenths," the roller of arms 65 must travel downwardly along the neck of the bottle to a level approximating 1½ inches below the top of the bottle where the arms 65 are spread apart to a spacing approximating 1⅝ inches and then moved upwardly to their inwardly retracted position. The first 1½ inches of the retraction movement must be fast enough to clear the lead roller (on the advancing side of the bottle) from the advancing side of the bottle.

In the first embodiment, which is illustrated in FIGS. 1–11 and 18–19, the transferring plunger 59 and the corresponding bottle normally should be more or less vertically aligned with each other when the plunger first engages the top of the bottle. In other words, the vertical axes of the plunger 59 and the bottle should coincide at the center of the application area. Otherwise if the plunger 59 is offset on the lead or lag side of the bottle, the arm 65 roller on the offset side may strike the top of the bottle at a position sufficiently offset from the peripheral edge of the top of the bottle to prevent the roller from moving outwardly around that peripheral edge and thence downwardly around the neck of the bottle. Naturally, the use of a roller and of springs 67 permits some leeway.

In the second embodiment, which is illustrated in FIGS. 12–17, the downwardly moving plunger 159 may actually engage the top of the bottle before the bottle reaches the center of the application area because such engagement will not interfere with the action of the stamp squeezing jaws 200. Furthermore, the jaws 200 of the second embodiment do not require as fast a down-and-up operation as their counterparts 65 in the first embodiment under corresponding operating conditions. While it is self-evident, we note: that the jaws 200 swing toward and away from opposite sides of the neck of the bottle from center points, which are always located above the top of the bottle; and that, once the jaw on the leading side of the bottle starts to swing away from the advancing side of the neck of the bottle, it is simultaneously lifted upwardly from the bottle by the mechanism which retracts the modified stamp affixer or squeezer as a whole.

Since the combined swinging and lifting movements of the jaws 200 tend to increase the horizontal spacing between the advancing side of the bottle and the adjacent or leading jaw 200, the lead jaw can clear the advancing side of the bottle at a vertical retraction speed which is substantially lower than that necessarily employed in the first embodiment. Of course it will be understood that the second embodiment is intended to stretch a gripped stamp before it is released by the grippers and to release the stretched stamp at about the moment the center portion of that stamp is pressed firmly against the top of the bottle.

It may be observed that I have been able to obtain gluing wheel speeds high enough to handle as many as 295 bottles per minute whereas speeds of 150 bottles per minute, if attained, are seldom exceeded in the prior practical art. This may be due, in part at least, to the fact that, in my arrangement, centrifugal force does not act on the bottles receiving the stamps since such bottles travel in a straight line and, to the extent that centrifugal force acts on stamps being transferred, such action is in the radially outward direction of the transfer which may, therefore, be aided thereby. It will be understood that my improved wheel may be horizontally rotated about a vertical axis to effect the horizontal transfer of a strip stamp in a direction proceeding radially outward from the periphery of the wheel.

Having described my invention, I claim:

1. An apparatus for applying a strip stamp over the top of a bottle, as it is carried by a bottle line conveyor through an applicating area, comprising: a frame; a shaft mounted on said frame; a gluing wheel structure mounted on said shaft to receive a strip stamp at a receiving area, convey it arcuately through a stamp gluing area, and release it at an applicating area where it is to be applied to the top of a bottle, said wheel rotating in a plane through which the long axis of the bottle travels in passing through said applicating area; and stamp affixing means including a stamp affixer mounted on the gluing wheel for relative radial extension-retraction movement and means for so extending the affixer at the applicating area, said affixer being operative, at the applicating area, to move the mid-portion of a stamp radially and press it upon the top of the bottle and to swing the end portions of said stamp radially and press them upon the neck of said bottle.

2. An improvement in a mechanism for strip stamping the top of a bottle, comprising: a stamp wheel structure adapted to be mounted for the endless movement of its periphery along a predetermined endless path extending successively through a receiving area, where a stamp is fed to its periphery, and a relatively spaced applicating area, where such stamp is radially transferred from its periphery to a bottle; stamp holding means on the wheel structure to receive and hold a stamp fed to the periphery of the wheel structure at the receiving area and to release that stamp when the wheel structure carries the stamp to and aligns it radially with the top of a bottle at the applicating area; an assembly including a block mounted on the wheel structure for endless movement bodily therewith and for radially slidable extension-retraction movement relative thereto and a plunger mounted on the block for endless and radial movement bodily with the block and for radially slidable retraction-extension movement relative to the block; said radially movable block being adapted to be moved radially outward from a normally occupied inwardly retracted position through a partially extended position to an outwardly extended position as it moves bodily through the applicating area; said plunger normally occupying an extended position in which it projects radially from the block and being adapted first, as the block is partially extended in the applicating area, to be carried radially outward into engagement with the mid-portion of the inner face of a strip stamp held on the wheel structure and through such engagement press the mid-portion of the outer face of that stamp radially outward into engagement with the top of a radially aligned bottle and second, as the stamp is released and the block continues its radial extension movement to its outwardly extended position in the applicating area, to remain in radially-stationary stamp-holding engagement relative to said bottle; and means carried by said assembly in position to engage the end portions or wings of a stamp during the extension of said block, said means being operative, during the radial extension movement which the block undergoes after the stamp is released, to press said wings against opposite sides of the neck of said bottle.

3. The improvement of claim 2 including: means normally retracting the block; and means normally extending the plunger.

4. The improvement of claim 3 wherein: the block retracting means includes a spring interposed between the wheel structure and the block; and the plunger extending means includes a spring interposed between the block and the plunger.

5. The improvement of claim 2 wherein: said stamp wheel structure is in the form of a rigid wheel having a relatively fixed axis of rotation; a plurality of said stamp holding means is spaced along the periphery of said wheel; and a plurality of said assemblies is provided, one for each stamp holding means.

6. The improvement of claim 5 wherein: each rigid wheel comprises an annular disc-like arrangement having a series of angularly-spaced radially-extending slideways arranged around said axis and a periphery characterized by a corresponding series of stamp-receiving lands, each land being radially aligned with its corresponding slideway; a stamp holding means is associated with each stamp-receiving land; and an assembly is associated with each radial slideway, the block of each assembly being mounted on the wheel for radial movement along the corresponding slideway.

7. The improvement of claim 6 wherein: each stamp-receiving land is slotted in radial alignment with the plunger of the corresponding block; and, during the partial extension of each block, the corresponding plunger is carried by its block to a position in which the plunger extends through the corresponding land slot and projects radially outward from the periphery of the wheel.

8. The improvement of claim 5 including: a shaft on which said wheel is mounted for rotation about said axis; means for retracting said block; and means for extending it outwardly in the stamp applicating area for stamp transferring and wing pressing purposes.

9. The improvement of claim 8 wherein: the block retracting means includes a retraction spring; the block extending means includes a cam and cam follower; and a spring is mounted on the block to urge the plunger toward its normally extended position.

10. The improvement of claim 9 wherein: a support is provided for said shaft; the block extending cam is stationarily carried by said support; and the block extending cam follower is carried by said block.

11. The improvement of claim 8 wherein the wing pressing means includes: a pair of arms mounted on the assembly, one arm for each wing.

12. The improvement of claim 11 including: means for moving said arms out of engagement with the stamp bearing sides of the neck of said bottle as the block reaches its outwardly extended position.

13. The improvement of claim 11 wherein: said arms are pivoted to the projecting end of said plunger; and a pair of arm-operating levers is provided, one for each arm, each lever pivotally interconnecting its arm with the block and operating to hold its arm outstretched until the block is partially extended sufficiently to bring the fully extended plunger into engagement with the top of a bottle and then operating to swing its arm into its stamp pressing position as the plunger is held radially stationary by the bottle while the block is further extended.

14. An apparatus for strip stamping the top of a bottle, comprising: a bottle-line conveyor operative to carry a bottle successively through a horizontal stamp-application area and a relatively elongate horizontal stamp-squeezing zone; a bottle-clamping means operative to clamp said bottle in a predetermined position on said bottle-line conveyor before said bottle enters said applicating area, hold said bottle in its clamped position as it passes through said applicating area and said squeezing zone and release the bottle after it has passed at least partway through the squeezing zone; strip stamping means operatively mounted at said applicating area, to receive a strip stamp for said clamped bottle, to convey it to said stamp applicating area and, as the clamped bottle passes through said applicating area, to press the mid-portion of said stamp upon the top of the clamped bottle and swing the end portions of said stamp toward and press them upon the neck of said clamped bottle, said strip stamping means including a shaft providing a fixed axis of rotation adjacent said bottle-line conveyor, a stamp wheel mounted on said shaft for rotation about said fixed axis during which the periphery of said wheel moves along a path extending successively through a receiving area, where the stamp is fed to its periphery, and said applicating area where said stamp is radially transferred from its periphery to said clamped bottle, means for applying an adhesive to said stamp before it reaches said applicating area, a plurality of stamp holding means spaced along the periphery of said wheel, each of said stamp holding means being arranged to receive and hold a stamp fed to the periphery of the wheel at the receiving area and to release that stamp when the wheel carries it to and aligns it radially with the top of a bottle in the applicating area, a plurality of stamp transfer assemblies spaced around said wheel, one for each of said stamp holding means, each assembly including a block mounted on said wheel for endless movement bodily therewith and for radially slidable extension-retraction movement thereto and a plunger mounted on said block for endless and radial movement bodily with the block and for radially slidable retraction-extension movement relative to the block, said block being adapted to be moved radially outward from a normally occupied inwardly retracted position through a partially extended position to an outwardly extended position as it moves bodily through the applicating area, said plunger normally occupying an extended position in which it projects radially from the block and being adapted first, as the block is partially extended in the applicating area, to be carried radially outward into engagement with the midportion of the inner face of a strip stamp held on the wheel structure and through such engagement press the mid-portion of the outer face of that stamp radially outward into engagement with the top of a radially aligned bottle and second, as the stamp is released and the block continues its radial extension movement to its outwardly extended position in the applicating area, to remain in radially-stationary stamp-holding engagement relative to said bottle, means carried by said assembly in position to engage the end portions or wings of the stamp during the extension of said block, said means being operaive, during the radial extension movement which the block undergoes after the stamp is released, to press said wings against opposite sides of the neck of said bottle, means for retracting said block to its normally retracted position, and means for extending said block outwardly in the stamp applicating area for stamp transferring and wing pressing purposes; and stamp squeezer means including a frame and a stamp squeezer mounted on said frame for movement through said elongate squeezing zone, said stamp squeezer having jaws which are operative to engage and squeeze the end portions of the stamp against the neck of the clamped bottle as it passes through said squeezing zone and to release said end portions when the bottle reaches the end of said squeezing zone.

15. The apparatus of claim 14 including: means for decreasing the spacing between the upper face of said bottle-line conveyor on which the bottle rests and said squeezer jaws as the bottle passes through the squeezing zone so as to cause the jaws to urge the wings of the stamp downwardly along the neck of the bottle and thereby tend to stretch the stamp into a smooth condition.

16. The apparatus of claim 15 wherein said spacing between the bottle-line conveyor and the squeezing jaws is reduced by mounting the bottle-line conveyor to rise a fraction of an inch as it travels through the squeezing zone.

17. An apparatus for assisting in securing the adherence of a strip stamp, the mid-portion of which extends over the top of a bottle and the end portions of which extend downwardly along opposite sides of the neck thereof, comprising: a bottle-line conveyor operative to carry said stamped bottle through a squeezing zone; stamp squeezer means including a frame and a stamp squeezer mounted on said frame for movement through said squeezing zone, said stamp squeezer having jaws which are operative, as said bottle passes through said zone, to squeeze the end portions of the stamp against the neck of said bottle from a point near the beginning of said squeezing zone to the end thereof; and means operative, after the bottle is firmly grasped by said squeezer jaws and while the bottle passes through the squeezing zone, to decrease the spacing between the upper face of said bottle-line conveyor on which the bottle rests and said squeezer jaws so as to cause the jaws to urge the wings of the stamp downwardly along the neck of the bottle and thereby tend to stretch the stamp into a smooth condition.

18. An apparatus for applying a stamp or label over the top of an article as it is carried by a conveyor through an applicating area, comprising: a frame; a gluing wheel mounted on said frame to rotate in a vertical plane about a horizontal axis above said conveyor and to receive a stamp at a receiving area, convey it arcuately through a stamp gluing area, and release it at an applicating area where it is to be applied to the top of the article; a stamp affixer mounted on the gluing wheel for relative radial extension-retraction movement, said affixer being operative, when radially extended at the applicating area, to move the stamp radially and press it upon the top of the article; and means for so extending the affixer.

19. An apparatus for applying a stamp over the top of a container, as it is carried by a line conveyor through an applicating area, comprising: a frame; a gluing wheel rotationally mounted on said frame for rotation about a horizontal axis and within a vertical plane containing said line conveyor, said wheel being arranged with its lower peripheral portion positioned directly over said applicating area and spaced from said conveyor; means on the periphery of said wheel to receive a stamp at a receiving station; means adjacent said wheel for applying glue to stamps thereon; means to release said stamp from the lower peripheral portion of said wheel, said stamp to be applied to the top of a container on said conveyor; a stamp affixer mounted on the gluing wheel for relative radial extension-retraction movement thereon, said affixer being operative, when radially extended at the applicating area, to move the mid-portion of the stamp radially outward in relation to said wheel and press it upon the top of a container on said conveyor and to swing the end portions of said stamp radially outwardly in relation to said wheel and press them against the sides of said container; and means for so extending said affixer in response to rotary movement of said wheel.

20. An apparatus as defined in claim 19 wherein said stamp affixer includes: a first means for pressing the mid-portion of said stamp against the top of a container; and pivoted members swingable in the plane of rotation of said wheel and engagable with the ends of a stamp for swinging the same against the sides of said container.

21. Apparatus as defined in claim 20 wherein: said pivoted members comprise a pivoted member leading said first means and a pivoted member trailing said first means.

22. Apparatus as defined in claim 19 wherein: said means on said wheel for receiving said stamp comprises peripherally spaced stamp clamping means; and said stamp affixer is mounted on said wheel for radial movement thereon between said stamp clamping means.

23. An apparatus for receiving and holding a strip stamp or other flexible sheet-like member, having a pair of oppositely disposed marginal edge portions, and for applying that member to a bottle as a bottle line conveyor carries that bottle through an applicating area, comprising: a frame; a shaft mounted on said frame; a gluing wheel structure mounted on said shaft to receive said member at a receiving area, grip and hold each of its aforesaid edge portions, convey the held member arcuately through a gluing area, and release it at said applicating area where it is to be applied to a bottle; and member affixing means including an affixer mounted on the gluing wheel for relative radial extension-retraction movement and means for radially extending the affixer at the applicating area, said affixer being operative, as it is radially extended at the applicating area, to move the mid-portion of said held member radially so as to stretch it, to press its mid-portion radially upon a bottle in said applicating area, to release its aforesaid edge portions and to swing said released edge portions radially outward and press them upon said bottle.

References Cited in the file of this patent

UNITED STATES PATENTS

| | | |
|---|---|---|
| 2,214,096 | Weiss | Sept. 10, 1940 |
| 2,244,796 | Ogden | June 10, 1941 |
| 2,280,730 | Talbot | Apr. 21, 1942 |
| 2,371,265 | Ray | Mar. 13, 1945 |
| 2,579,775 | Allen et al. | Dec. 25, 1951 |
| 2,833,439 | Scott | May 6, 1958 |